(12) United States Patent
Chea, Jr. et al.

(10) Patent No.: US 6,741,675 B2
(45) Date of Patent: *May 25, 2004

(54) METHOD AND APPARATUS FOR GENERATING AN AUDIBLE TONE IN DSL ENVIRONMENT

(75) Inventors: Ramon C. W. Chea, Jr., San Jose, CA (US); P. Kingston Duffle, Palo Alto, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 09/911,550

(22) Filed: Jul. 23, 2001

(65) Prior Publication Data

US 2003/0179859 A1 Sep. 25, 2003

Related U.S. Application Data

(63) Continuation of application No. 09/493,342, filed on Jan. 28, 2000, now Pat. No. 6,292,540.

(51) Int. Cl.7 .......................... H04M 1/24; H04M 3/08; H04M 3/22
(52) U.S. Cl. .................. 379/22.04; 379/21; 379/27.01; 379/29.03; 379/30
(58) Field of Search .............................. 379/1.01, 1.04, 379/21, 19, 22.01, 22.02, 22.03, 24, 26.01–26.31

(56) References Cited

U.S. PATENT DOCUMENTS

| | | | |
|---|---|---|---|
| 5,574,769 A | 11/1996 | Clement | 379/21 |
| 5,909,113 A | 6/1999 | Clement et al. | 324/66 |
| 6,292,540 B1 * | 9/2001 | Chea, Jr. et al. | |

FOREIGN PATENT DOCUMENTS

| | | |
|---|---|---|
| US | 99/14921 | 3/1999 |

* cited by examiner

Primary Examiner—Duc Nguyen
(74) Attorney, Agent, or Firm—Pillsbury Winthrop LLP

(57) ABSTRACT

The invention presented herein is directed to a battery injection and loop supervision (BILS) system and method that can be used in the DSL environment. The BILS of the present invention provides battery injection, loop supervision, and butt set operation mode detection in the DSL environment. A voltage source, detector and comparator in the BILS unit can be used to supervise the copper loop status from the central office. In addition, using the present invention, a field technician using a conventional butt set can detect battery voltage and receive an audible tone from the cooper loops in the DSL environment. Furthermore, the BILS can be implemented in accordance with two preferred embodiments, voltage sensing and current sensing. The BILS includes circuitry, working in conjunction with a shared common resource card and a conventional butt set, for testing, maintaining, and installing copper loops in the DSL environment.

16 Claims, 9 Drawing Sheets

Battery Injection/Loop Supervision-System Functional Diagram

METHOD AND APPARATUS FOR GENERATING AN AUDIBLE TONE IN DSL ENVIRONMENT

This is a continuation application of U.S. Ser. No. 09/493,342, filed Jan. 28, 2000 now U.S. Pat. No. 6,292,540.

FIELD OF THE INVENTION

The present invention relates to a system and method for connecting copper loops to a central office in a digital subscriber loop (DSL) environment. More particularly, the present invention is directed to a system and method for connecting a battery to copper loops and for supervising the status of such loops from the central office in the DSL environment. In addition, the present invention discloses circuitry allowing a field technician using a conventional butt set to detect the presence of a battery and to receive an audible tone from the cooper loops in the DSL environment.

BACKGROUND OF THE INVENTION

Digital Subscriber Loop, or DSL, is one of the most promising new technologies for delivering superior service and higher speed connections over existing infrastructure in the telecommunications industry. Recent changes in the telecommunications industry such as the deregulation of local markets has brought on the emergence of new technologies such as DSL. In addition, the growing demand for faster, more reliable Internet access has increased the demand for technologies that deliver higher speed connections over existing infrastructure.

In general, DSL uses the existing copper loop that is currently used for conventional telephony to deliver data at high bandwidth. Currently, the transmission rates for DSL technologies are dependent on the distance between a central office and a particular customer. Moreover, depending on the type of DSL technology, the transmission rate downstream to the customer and upstream to the central office may vary. For example, for asymmetric DSL, the transmission rate is faster downstream to the customer than upstream to the central office, and thus is well suited for Internet usage and video on demand. On the other hand, for symmetric DSL, the transmission rate is about the same for both downstream and upstream.

As is well known, DSL uses packet switching technology that operates independently of voice telephone system, allowing telephone companies to provide Internet service and not lock up circuits for telephone calls. DSL can carry both voice and data signals simultaneously, in both directions, allowing the customer to log onto the Internet and make a telephone call at the same time. Thus, it is easy to understand why DSL is becoming the preferred system and method for sending/receiving analog and digital data/signals in the telecommunications industry.

One major problem for those in this industry is the installation and maintenance of DSL using the existing infrastructure and standard operational tools. This problem is better understood by first describing the installation/testing process in a conventional POTS (plane old telephone system) environment, which is described in greater detail hereinafter with reference to FIGS. 1–3.

FIG. 1 illustrates a simplified diagram of a POTS environment having a butt set connected to a copper loop for maintenance and testing purposes. In the conventional POTS environment, a central office (CO) 2 is connected to a customer's telephone 8 at the customer's premise 6 (home, office, etc.) using a copper loop 4 (pair of copper wires). In between the CO 2 and the customer's premise 6, a field technician 12 uses a conventional butt set 10 or any other maintenance instrument to test the copper loop. The butt set 10 is generally a standardized device that the technician 12 uses to determine which copper loop is active and/or available for customers. The butt set 10 is essentially a portable and rugged telephone set. For example, once the butt set 10 is connected to a cooper loop via electrical clips, the technician 12 can simulate a telephone going off-hook to draw audible tones. A voice switch (not shown) in the CO 2 recognizes an off-hook condition through its loop supervision circuit and applies audible tones to the loop allowing the technician 12 to confirm proper connectivity.

The butt set 10 illustrated herein is equivalent to a telephone handset to test/maintain communication wires. The term butt set is used in this field, presumably because the butt set 10 includes a hook for fastening it to a tool belt and tends to hand down along the technician's buttocks. The butt set 10 generally includes a microphone, earphone, and a speaker.

FIG. 2 illustrates a diagram of an existing circuit used in the POTS environment as shown in FIG. 1. The CO 2 typically includes a SLIC (subscriber loop interface circuit) 20 for interfacing with a pair of wires, tip and ring, from the outside plant. The SLIC 20 includes an amplifier AT 22 connected in series to a resistor $R_{b1}$ 26, and an amplifier AR 24 connected in series to a resistor $R_{b2}$ 28. The amplifier AT 22 and resistor $R_{b1}$ 26, and the amplifier AR 24 and resistor $R_{b2}$ 28 form a balance drive interface circuit to the tip and ring wires. As known, the SLIC 20 can be implemented with transformers instead of amplifiers AT 22, AR 24. Further connected in between the resistor $R_{b1}$ 26 and the resistor $R_{b2}$ 28 is a detector 30. Typically, the ohm values of the resistors $R_{b1}$ 26 and $R_{b2}$ 28 are equal (50 to 400 ohms). The voltage $V_b$ is the effective battery voltage across the tip and ring wires.

The detector outputs a signal voltage $V_s$ (which is proportional to the DC current flow in the loop, which in turn is proportional to the length of the loops and is reflected as resistance) into a comparator C 32, while a reference voltage $V_r$ is also inputted into the comparator C32. The comparator C 32 then outputs a loop status indication signal (SHD) based on voltages $V_s$ and $V_r$.

In the outside plant, there also exist resistors $R_{l1}$ 34 and $R_{l2}$ 36, where each resistor is connected in series to the tip and ring wires, respectively. As is well known, tip and ring are terms used to describe the two wires that are used to set up a telephony/DSL connection. Typically, the ohm value of resistors $R_{l1}$ 34 and $R_{l2}$ 36 are the same, which is also dependent on the length of the loop.

In the customer's premise 6, the telephone 8 can be represented with an off-hook switch $S_p$ 38 connected in series with a resistor $R_p$ 40. The resistor $R_p$ 40 typically has a value of, preferably, between 100 to 200 ohms (off-hook resistance is less than or equal to 400 ohms). Further, the sum of the resistors $R_{ll}$ 34, $R_{l2}$ 36, and $R_p$ 40 should be less than or equal to 1900 ohms, as per conventional telephony standards.

The butt set 10 includes a monitor mode switch $S_m$ 50 connected in series with a monitor mode resistor $R_m$ 52 (typically greater than 100K ohms), which switch $S_m$ 50 and resistor $R_m$ 52 are further connected in parallel with a talk mode switch $S_t$ 54 and a talk mode resistor $R_t$ 56 (typically less than 400 ohms). Thus, the butt set 10 can provide two different modes of operation, as described in greater detail hereinafter. The butt set 10 also includes two leads, where one lead is connected to the tip at position a and the other lead is connected to the ring at position a'.

During operation in the POTS environment, a battery is used to provide a DC path or current flow beginning from the amplifier AT 22 through resistors $R_{b1}$ 26, $R_{l1}$ 34, $R_p$ 40, $R_{l2}$ 36, $R_{b2}$ 28 to the amplifier AR 24. Thus, the current flowing through this circuit is inversely proportional to the sum of the resistors $R_{b1}$ 26, $R_{l1}$ 34, $R_p$ 40, $R_{l2}$ 36, and $R_{b2}$ 28. When the customer picks up the telephone 8 to make a call, the detector 30 detects that the telephone 8 is off hook, a DC path is generated, and the CO 2 recognizes an off-hook condition, thereby providing a dial tone to the customer. In this environment, the frequency signals in the copper loop operate within the voice/audio bandwidth and the DC current path is used for loop supervision.

During the maintaining, testing, or installing stage, the technician 12 uses the butt set 10 to connect to the tip and ring wires at points a, a'. The butt set 10 is ideal for using in the POTS environment since it is designed to perform all the standard telephone functions. The technician 12 first determines whether any or both the wires on the copper loop are live or dead using the butt set 10.

When the butt set 10 is switched in the monitor mode, a high impedance voltmeter (not shown) equivalent can be used to determine the existence of proper DC voltages to indicate a live loop. In addition, in the monitor mode, the technician 12 can listen for audio tones on the wires, which is another indication of whether the wires are alive or dead. When the technician 12 desires to use the copper pair to talk to someone at the CO 2, the butt set 10 can be switched to talk mode using switch $S_t$ 54 and the resistor $R_t$ 56, which is similar to the resistor $R_p$ 40 in the telephone 8. The CO 2 then generates a dial tone for the technician 12 so that he/she can make a call.

The conventional testing and maintaining method is generally acceptable in the POTS environment, but as will be described below, it is inadequate in testing, maintaining, and installing in the DSL environment.

FIG. 3 illustrates a simplified diagram of a DSL environment having a butt set connected to a copper loop. In the DSL environment, the CO includes a DTU-C (DSL termination unit—CO) 102 having capacitors C 104 and inductors 106. One end of the copper loop is connected to the DTU-C 102 at point TR2 and the other end is connected to the customer's premise at point TRI. The customer's premise also includes a DTU-R (DSL termination unit—remote) 120 having capacitors 122 and inductors 124.

In the DSL environment, the conventional system and method using the butt set 10 is generally inadequate for testing/maintaining/installing. It is well known that in the DSL environment no DC path or current flow is possible since a battery ("dry circuit") is not used at the CO, and thus, the butt set 10 will typically not function properly under this environment. For example, the butt set 10 can not detect the presence of a DC voltage since no battery is present. As a result, there is no loop status supervision in this environment.

Further, there is no mechanism to access/draw/detect audible tones in this environment because DSL signals operate at frequency above voice/audio bandwidth. Thus, field technicians have a difficult time testing/maintaining/installing the outside copper loop using the conventional instrumentation. For example, technicians can not determine whether a copper loop is alive or dead using the conventional butt set 10, which in many cases, results in removing live copper loops from service. As a result, the technician make mistakes such as improperly connecting the copper loop to the CO and disconnecting a "good service" from an existing DSL customer.

Accordingly, there is a need for a system and method for providing a reliable and effective manner of testing, maintaining, and installing a copper loop in the DSL environment. There is also a need for implementing a system and method for maintaining, testing, and installing in the DSL environment using conventional butt sets.

SUMMARY OF THE INVENTION

It is an object of the present invention to provide a battery injection and loop supervision unit in the DSL environment.

It is another object of the present invention to provide a system and method for verifying connections between the central office and the customer in the DSL environment using a conventional butt set.

It is yet another object of the present invention to provide a more cost-, labor-, and time-efficient and reliable system and method for testing, maintaining, and installing copper loops in the DSL environment.

It is a further object of the present invention to provide a system and method for identifying whether a copper loop is active or idle in the DSL environment using a conventional butt set.

It is yet another object of the present invention to provide a system and method for generating audible tones to a technician using a conventional butt set in the DSL environment working in conjunction with a common resource card.

It is another object of the present invention to provide loop supervision in the DSL environment.

These and other objects of the present invention are obtained by providing a battery injection and loop supervision (BILS) system and method that can be used in the DSL environment. The BILS can be implemented in accordance with two preferred embodiments, voltage sensing and current sensing. The BILS includes circuitry, working in conjunction with a shared common resource card and a conventional butt set, for testing, maintaining, and installing copper loops in the DSL environment. The BILS working in conjunction with the shared common resource card generates battery voltage and audible tones for the technician and further provides loop supervision. Furthermore, the BILS eliminates technician's mistakes while he/she is testing, maintaining, installing a copper loop for a customer, thereby saving valuable time and resources for the LECs (Local Exchange Carrier) such as CLECs (Competitive Local Exchange Carrier) and ILECs (Incumbent Local Exchange Carrier).

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
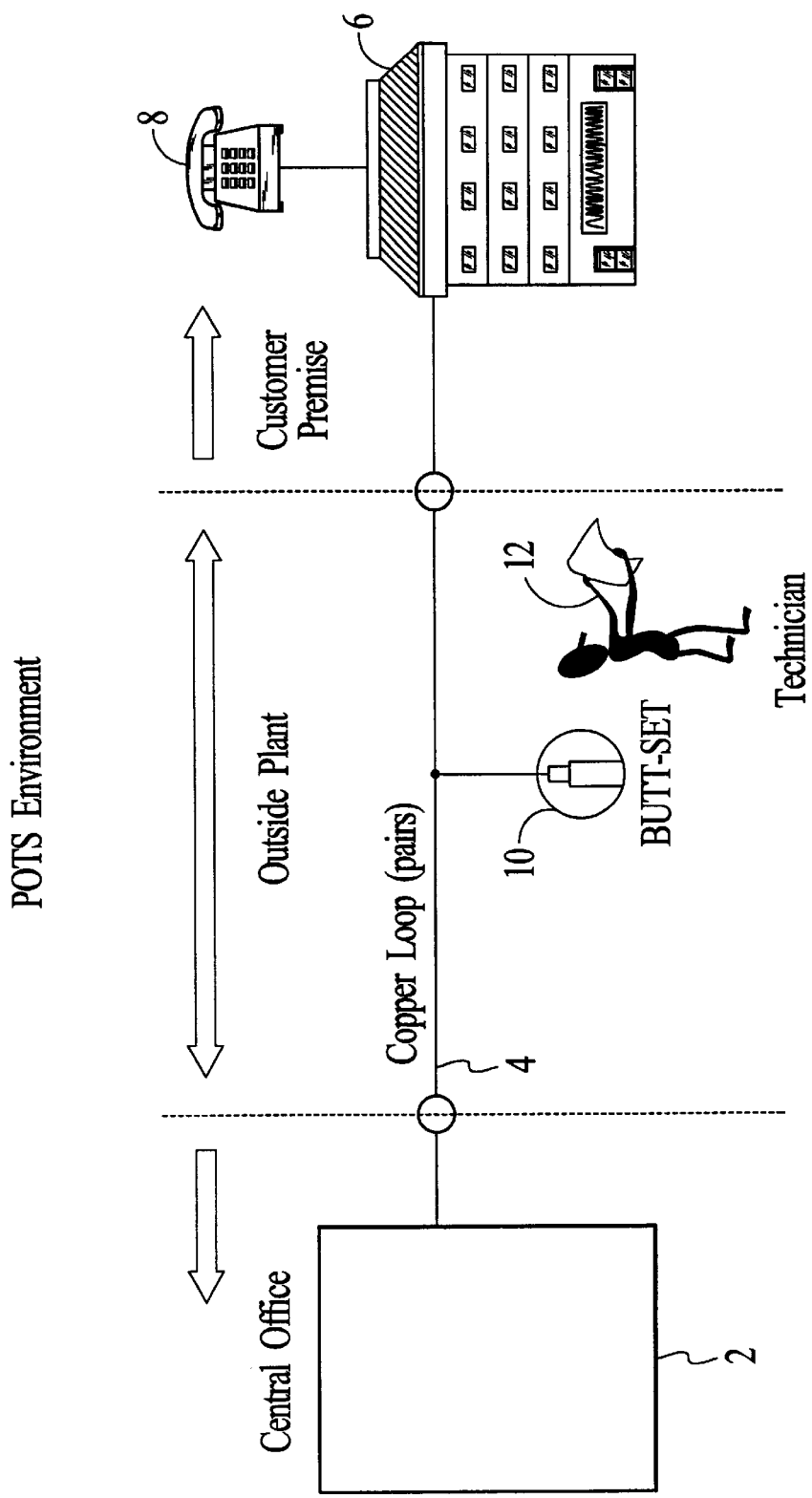
FIG. 1 illustrates a simplified diagram of a POTS environment having a butt set connected to a copper loop.
Figure 2:
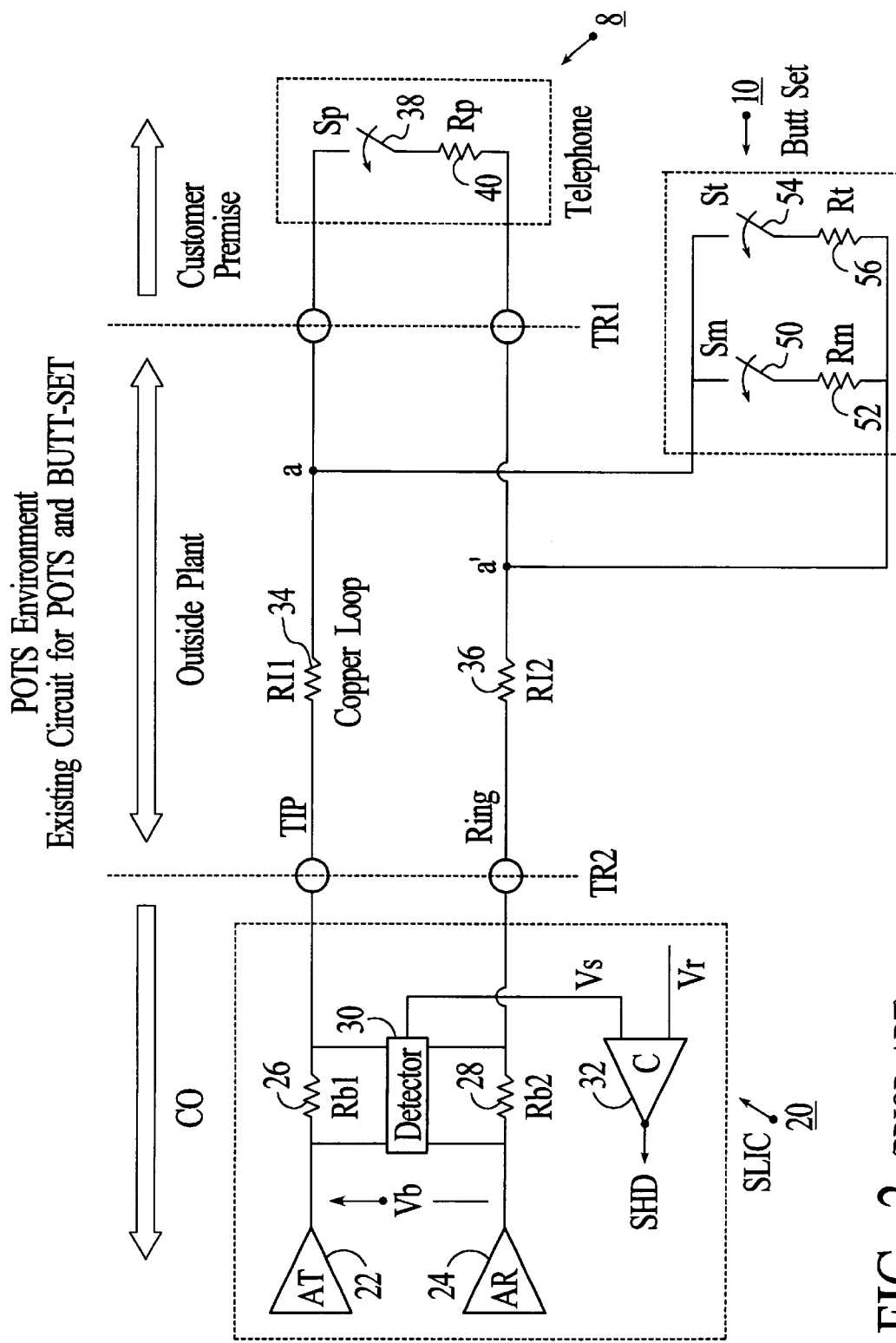
FIG. 2 illustrates a diagram of an existing circuit used in the POTS environment as shown in FIG. 1.
Figure 3:
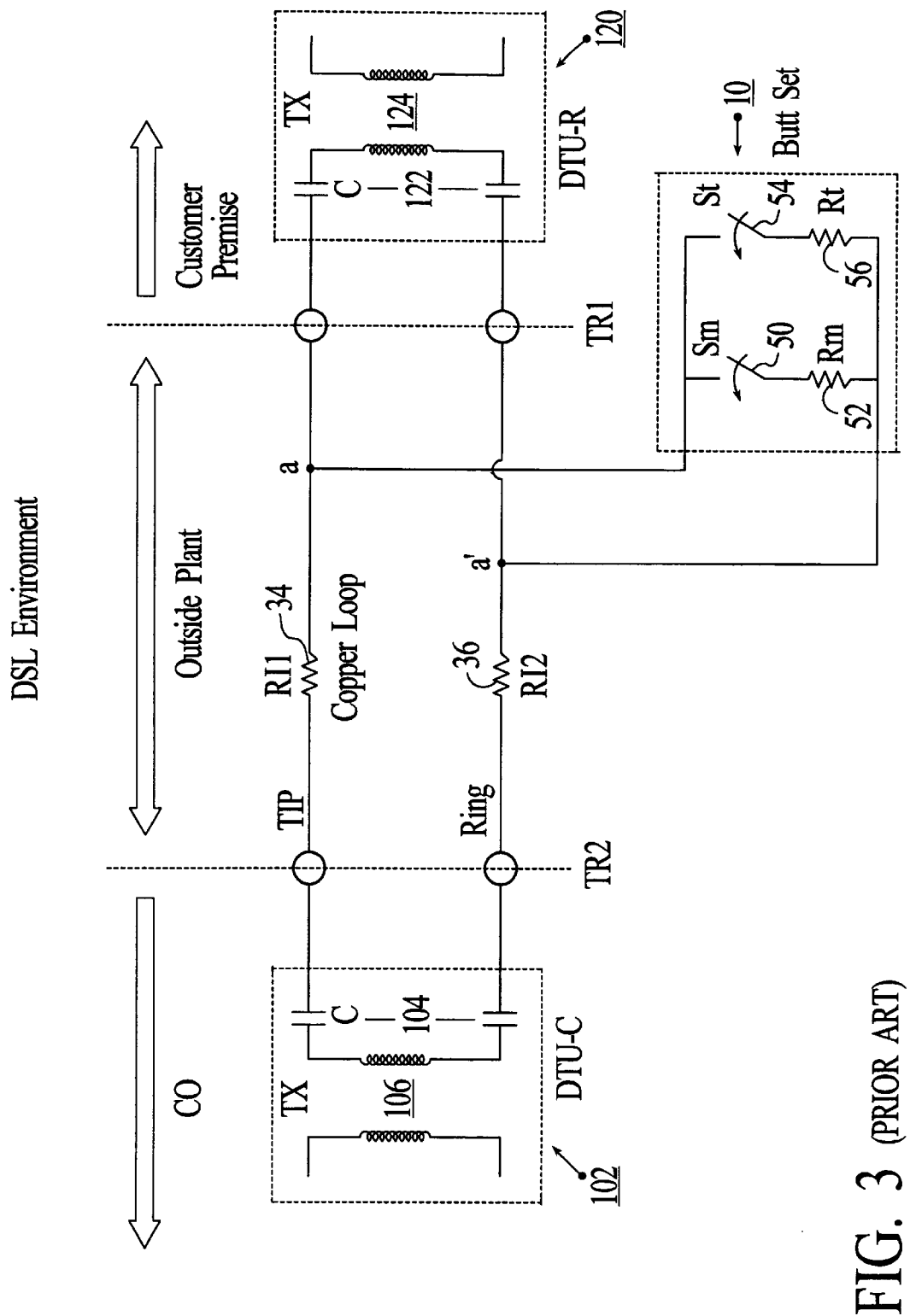
FIG. 3 illustrates a simplified diagram of a DSL environment having a butt set connected to a copper loop.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 4–7, wherein like components and steps are designated by like reference numerals throughout the various figures. Further, specific parameters such as potential differences, voltage values, circuit layouts, and the like are provided herein, and are intended to be explanatory rather than limiting.

Figure 4:
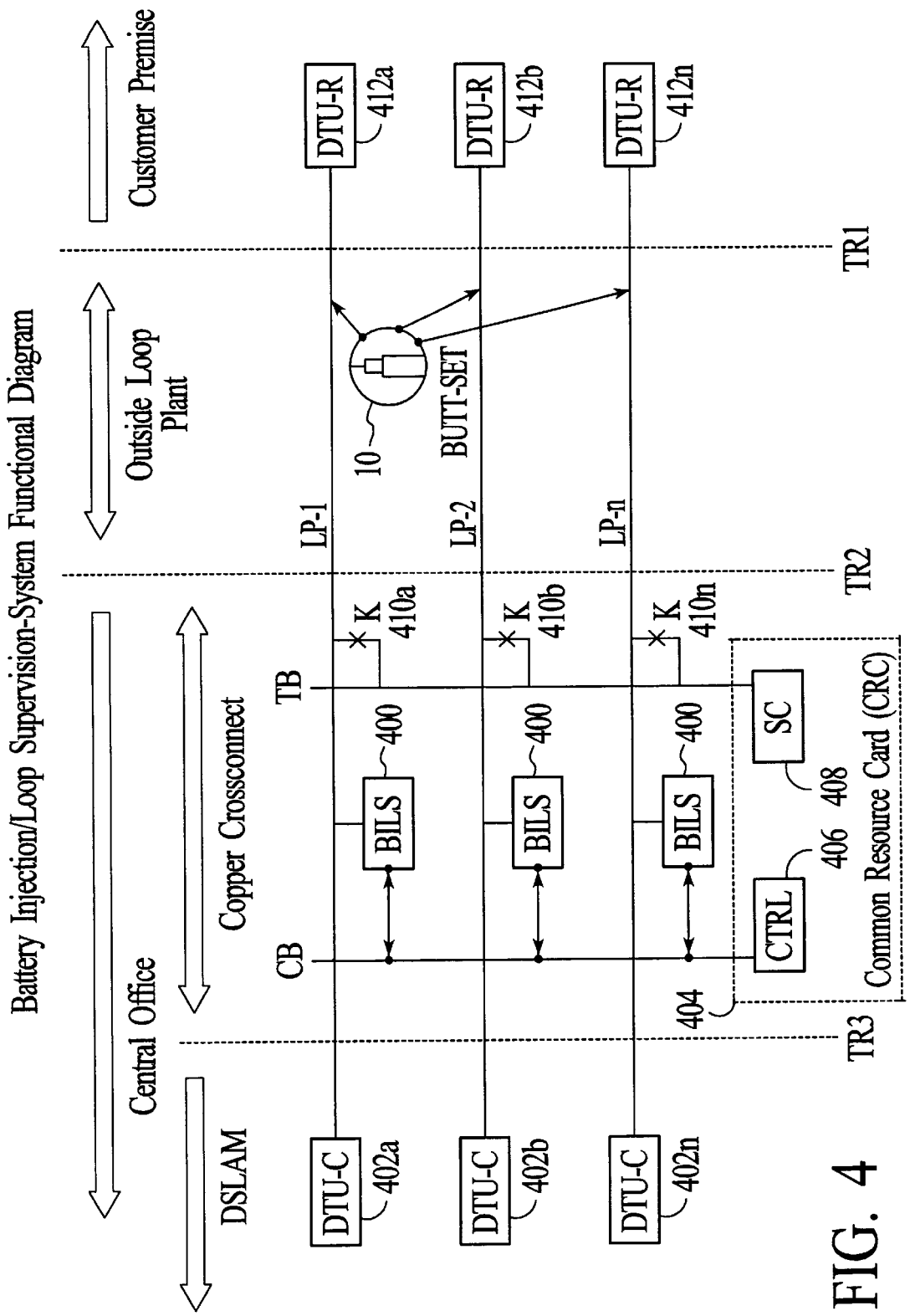
FIG. 4 illustrates a system level functional block diagram of a DSL environment implementing a battery injection and loop supervision unit in accordance with the preferred embodiment of the present invention.

FIG. 4 illustrates a system level functional block diagram of a DSL environment implementing a battery injection and loop supervision unit in accordance with the preferred embodiment of the present invention. In the central office (CO), cooper loops (LP-1, LP-2, . . . , LP-n) terminate directly on the DTU-Cs (DSL termination unit—CO) 402a, 402b, 402n, or the DSL Access multiplexers (DSLAMs), instead of conventional telephony gear such as voice switches. DSLAMs are devices that are generally located in the CO that terminates incoming DSL lines and aggregates the traffic onto high-speed uplink trunks such as ATM or Frame Relay. The other ends of the copper loops LP-1, LP-2, . . . , LP-n, are connected to the DTU-Rs (DSL termination unit—remote) 412a, 412b, 412n, at the customers' premises. Positioned in between the DTU-Cs 402a, 402b, 402n, and the DTU-Rs 412a, 412b, 412n, at the CO is a cross connect unit such as the CX100 Copper Cross-Connect System from Turnstone Systems, Inc., for linking DSLAMs or DTU-Cs with the copper loops LP-1, LP-2, . . . , LP-n. The CX100 Copper CrossConnect System is a platform that automates the physical layer infrastructure in COs, enabling Local Exchange Carriers (i.e., ILECs, CLECs) to remotely control, test, and manage the copper loops LP-1, LP-2, . . . , LP-n. Additional information regarding Turnstone System's CX100 Copper CrossConnect System can be found at the web site http://www.trunstone.com, which contents are herein incorporated by reference. It is also noted that other cross connect units providing similar functionalities as the CX100 Copper CrossConnect System can be implemented in the present invention.

Each copper loop LP-1, LP-2, . . . , LP-n, connects a DTU-C 402a, 402b, 402n, to a DTU-R 412a, 412b, 412n, via a transfer contact pair of a form-c relay K 410a, 410b, 410n. This connection is achieved through the normally closed contacts when the relay K 410a, 410b, 410n, is in the "reset" or "de-energized" mode. On the other hand, when relay K 410a, 410b, 410n, is in the "set" or "energized" mode, the DTU-R 412a, 412b, 412n, is connected to test bus (TB) via the normally open transfer contacts, which, in turn, is connected to a service circuit (SC) 408 located on a common resource card (CRC) 404.

The SC 408 on the CRC 404 is shared with n numbers of copper loops. In the context of the Turnstone System's CX100 Copper CrossConnect System, n is preferably 550, but other numbers of copper loops can be used depending on the type of cross connect unit employed. The SC 408 typically performs POTS functions such as DC talk current, voice band signal processing, loop supervision, and test head instrumentation for loop parameter measurements. Similarly, a control processor (CTRL) 406 on the CRC 404 is also shared by n numbers of copper loops via the control bus (CB). The CRC 404 can be implemented via hardware/software as a part of the cross connect unit (i.e., CX 100 Copper CrossConnect System).

Associated with the cross connect unit in the CO, a battery injection and loop supervision unit (BILS) 400 and a corresponding relay K 410a, 410b, 410c, or equivalent functional element is connected to one copper loop. Between the DTU-C 402a, 402b, 402n, and the DTU-R 412a, 412b, 412n, the BILS 400 is connected across the tip and ring wires of the copper loops. The BILS 400 can convey loop supervision status information via a digital logic hardware interface block (not shown) to the control processor CRTL 406 on the CRC 404. The BILS 400 contains hardware that can be implemented per line, card, or system for cost optimization, depending on the number of copper loops associated with the system. The control processor CTRL 406 can convey control signals to the relay K 410a, 410b, 410n, through the digital hardware interface (not shown). This is described in greater detail later herein.

In the outside plant, the butt set 10 can be connected to one of the copper loops via tip and ring wires, preferably somewhere between points TR1 and TR2. TR1, TR2, TR3 indicate demarcation boundary points in these figures.

As mentioned above, the BILS 400 can be used in the DSL environment for testing, maintaining, and installing copper loops using conventional butt sets. In short the BILS 400 includes a battery (DC voltage source) for loop supervision and the CRC 404 includes its own battery for generating audible tones. More detailed descriptions of the BILS 400 and the CRC 404 are illustrated in the following figures.

Figure 5:
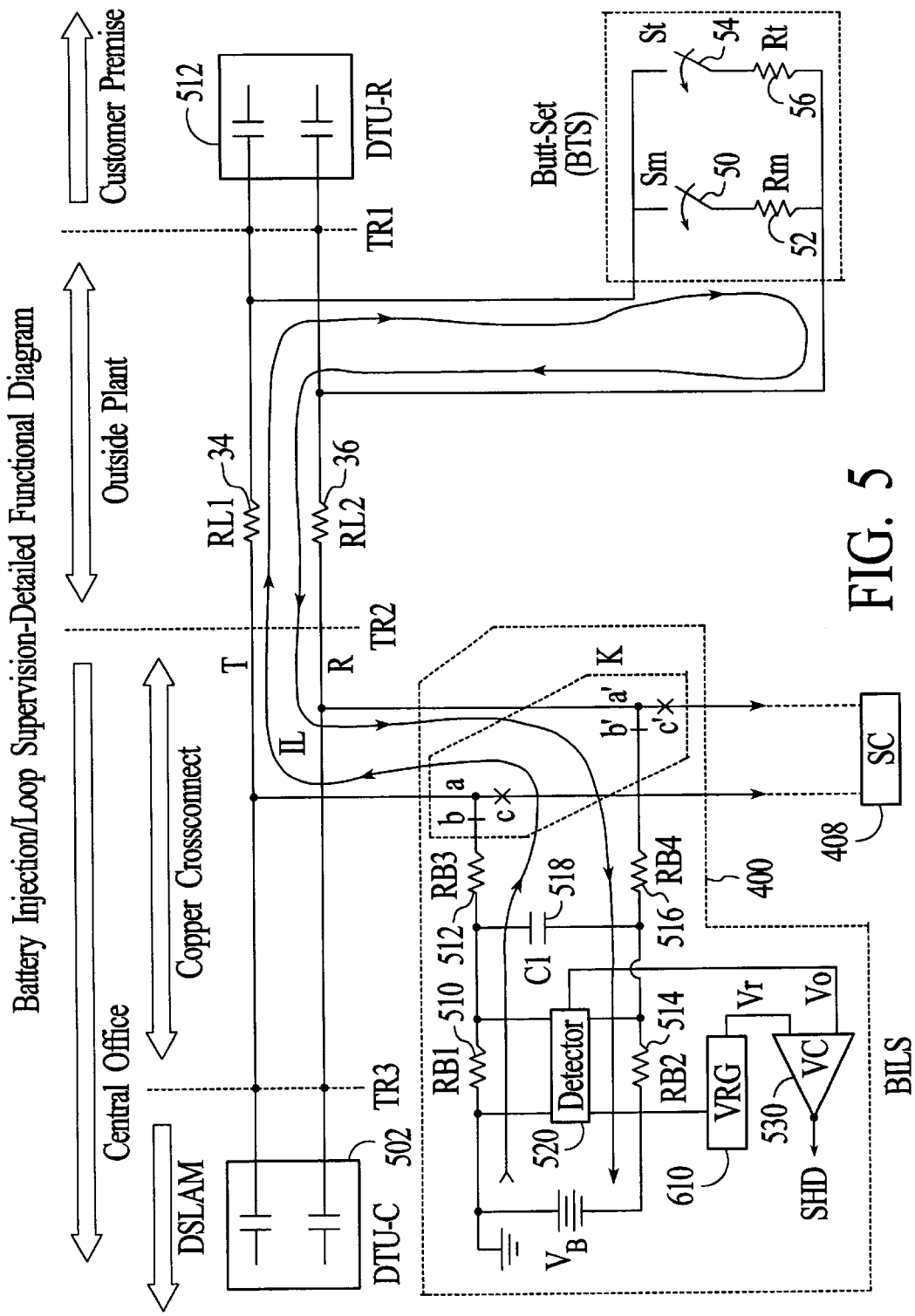
FIG. 5 illustrates a more detailed functional block diagram of a DSL environment implementing a battery injection and loop supervision unit in accordance with the preferred embodiment of the present invention.

FIG. 5 illustrates a more detailed functional block diagram of a DSL environment implementing a battery injection and loop supervision unit in accordance with the preferred embodiment of the present invention. The BILS 400 of the present invention performs three important functions, battery injection, loop supervision, and switching. Functionally, the battery injection aspect of the invention is performed using resistors $R_{b1}$ 510, $R_{b3}$ 512, $R_{b2}$ 514, and $R_{b4}$ 516, voltage $V_b$, and capacitor C, 518. The loop supervision aspect of the invention can be performed using the detector 520, voltage reference generator VRG 610, and the comparator VC 530. Furthermore, the switching aspect of the invention can be implemented using relay K. These three aspects of the present invention are described in greater detail hereinafter.

As discussed earlier herein, there is no DC path between the DTU-C 502 (i.e., 402a, 402b, . . . , 402n) and the DTU-R 512 (i.e., 412a, 412b, ..., 412n) due to the capacitors in the DTU-C 502 and DTU-R 512 coupling to the tip and ring wires. However, using the BILS 400, a DC path can be generated when the butt set (BTS) 10 is connected to the copper loop between points TR1 and TR2. As discussed in the background section, the butt set 10 can be switched between monitor and talk mode. When the switch $S_M$ 50 (monitor mode) is selected, resistor $R_m$ 52 is connected across the tip and ring wires, thereby providing a DC path and enabling a DC current to flow. Generally, resistor $R_m$ 52 has a very high ohm value (>100 k ohms) to allow monitoring of the signal in the loop without any material disturbance to the loop (i.e., provides stability).

The source of the DC current is from voltage $V_b$, and the current flow is through the resistors $R_{b1}$ 510, $R_{b3}$ 512, contacts b and a, resistor $R_{l1}$ 34, switch $S_m$ 50, resistors $R_m$ 52, $R_{l2}$ 36, contacts a' and b', and resistors $R_{b4}$ 516, $R_{b2}$ 514. The magnitude of the current is determined by the value of voltage $V_b$ and resistors $R_{b1}$ 510, $R_{b3}$ 512, $R_{l1}$ 34, $R_m$ 52, $R_{l2}$ 36, $R_{b4}$ 516, $R_{b2}$ 514. When the butt set 10 is in the monitor mode, it can measure/detect DC voltage or audio tones depending on the capability of the particular butt set 10. The presence of proper DC voltage or audio tones indicates that the copper loop is active or busy. Further, because the resistor $R_m$ 52 has a very high ohm value (>100 k ohms), a loop supervision detector 520 is designed not to recognize an off-hook condition. Accordingly, the monitor mode operation of the butt set 10 will not trigger any system responses.

Alternatively, when the switch $S_t$ 54 (talk mode) in the butt set 10 is selected, resistor $R_t$ 56 is connected across the tip and ring wires. The resistor $R_t$ 56 has a relatively low ohm value typically in the range of 100 to 400 ohms. Again, a DC path is generated in a manner similar to that above, enabling a DC current to flow through the circuit. The source of the DC current is voltage $V_b$, and the current flow is through the resistors $R_{b1}$ 510, $R_{b3}$ 512, contacts b and a, resistor $R_{l1}$ 34, switch $S_t$ 54, resistors $R_t$ 56, $R_{l2}$ 36, contacts a' and b', and resistors $R_{b4}$ 516, $R_{b2}$ 514. Also, the magnitude of the current is determined by the values of voltage $V_b$ and resistors $R_{b1}$ 510, $R_{b3}$ 512, $R_{l1}$ 34, $R_t$ 56, $R_{l2}$ 36, $R_{b4}$ 516, $R_{b2}$ 514.

The loop supervision detector 520 is designed to monitor the copper loop and recognize that talk mode in the butt set 10 as an off-hook condition, thereby outputting an appropriate loop status indication signal SHD or loop status signal $V_{sd}$ to the control processor CTRL 406 on the CRC 404. The control processor CTRL 406 will then send a signal to activate relay K, thereby connecting the butt set 10 to the service circuit SC 408.

It is important to note that this aspect is a key feature of the present invention because an off-hook condition is detected by a simple per-line loop supervision detector 520, and then subsequently switched to a shared service circuit SC 408, which can be shared among n number of copper loops for processing POTS related functions (e.g., audible tones).

In greater detail, when the service circuit SC 408 is connected to the butt set 10 during the talk mode, it will provide an appropriate dc current, usually with a minimum value of 20 mA, to operate a microphone within in the butt set 10. The service circuit SC 408 can also provide audio tones of a specific frequency, depending on factors such as capability of the service circuit SC 408 and the type of request received from the butt set 10. What is important to note herein is that a communication channel is established between the BILS 400 and/or the CRC 404 with the butt set 10, thereby providing a means for the field technician to test, maintain, and install copper loops in the DSL environment.

Figure 6A:
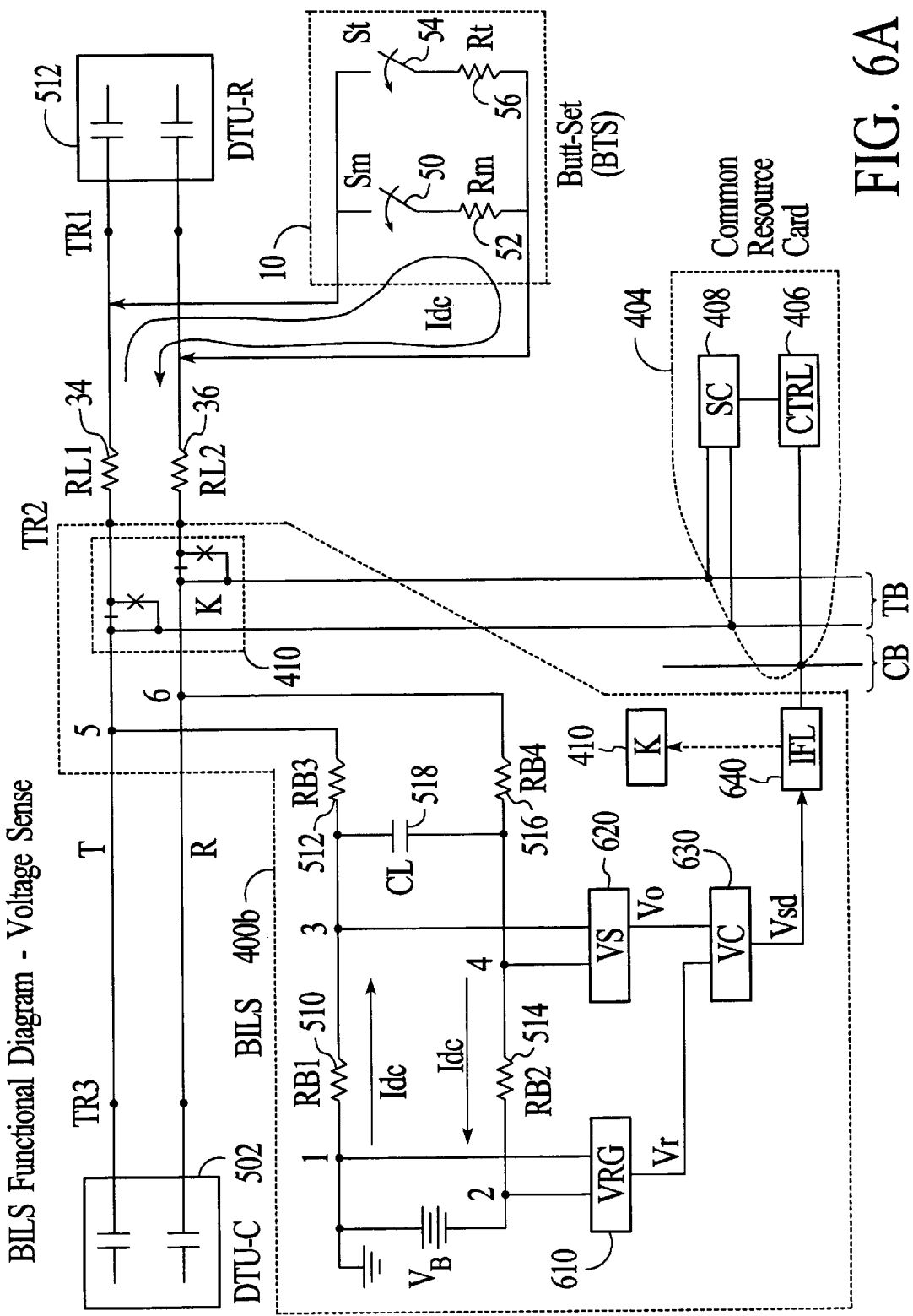
FIG. 6A illustrates a BILS functional block diagram in accordance with the first preferred embodiment of the present invention.
Figure 6B:
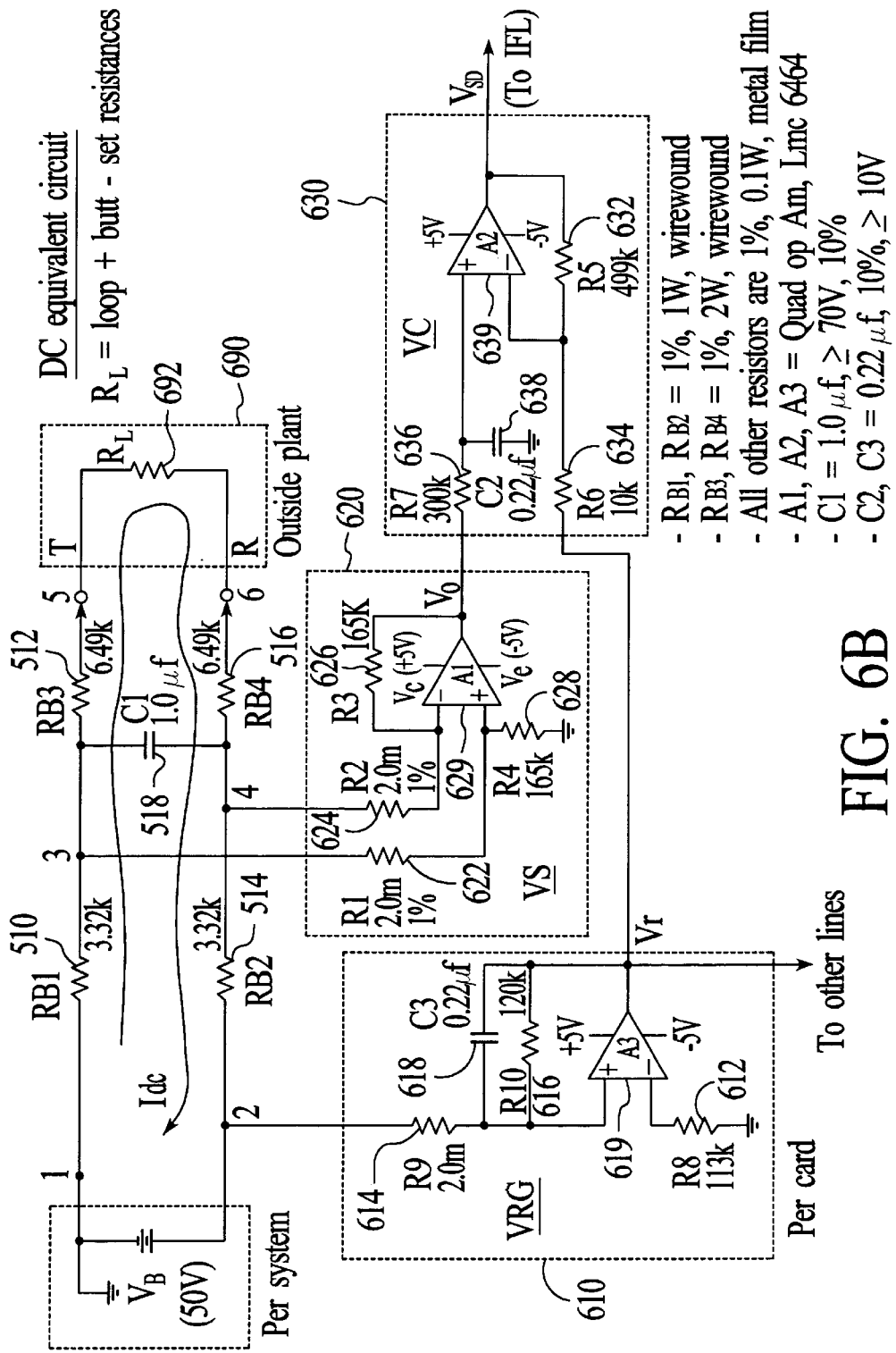
FIG. 6B illustrates a detailed circuit diagram of the BILS in accordance with the first preferred embodiment of the present invention.
Figure 7A:
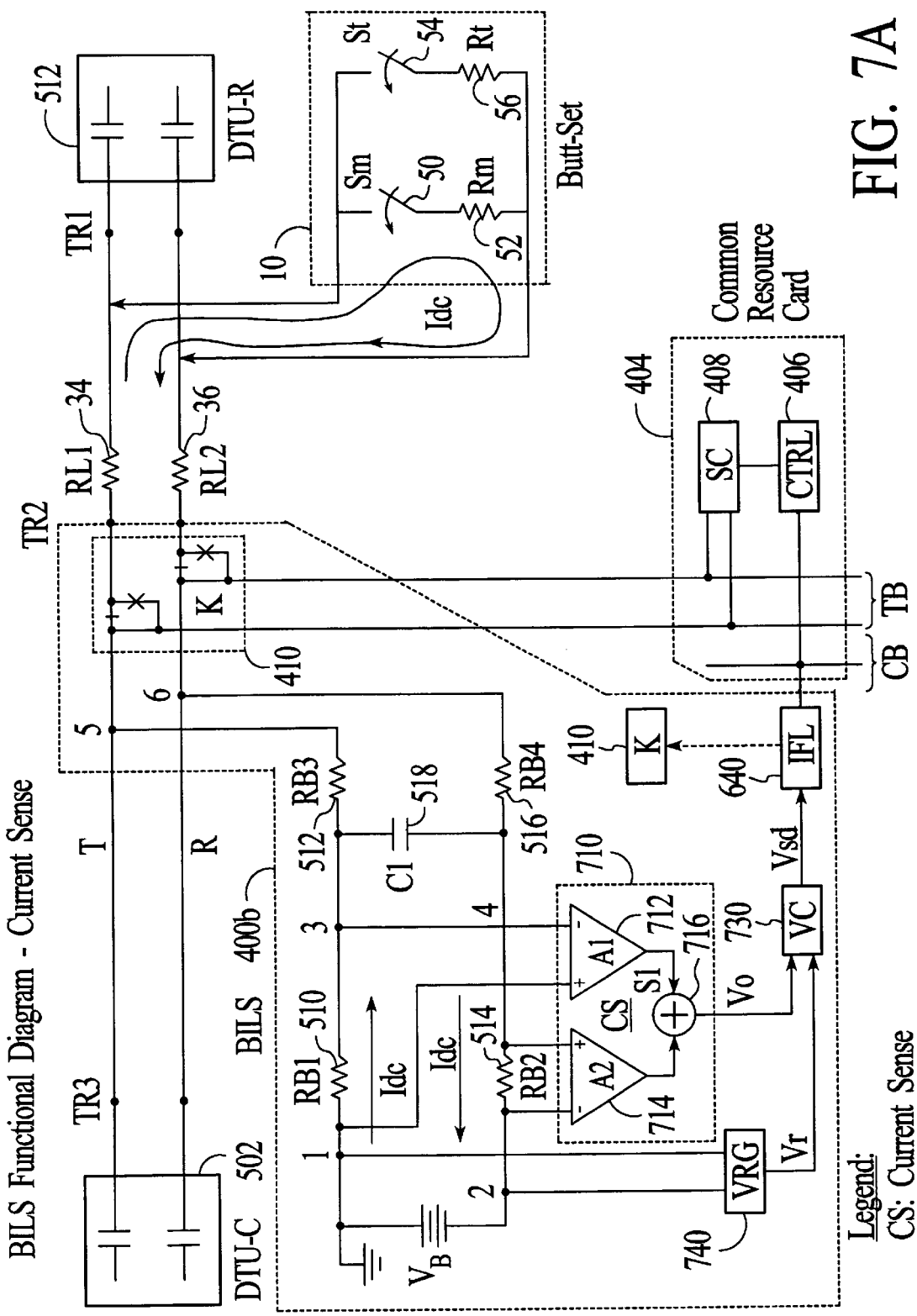
FIG. 7A illustrates a BILS functional block diagram in accordance with the second preferred embodiment of the present invention.
Figure 7B:
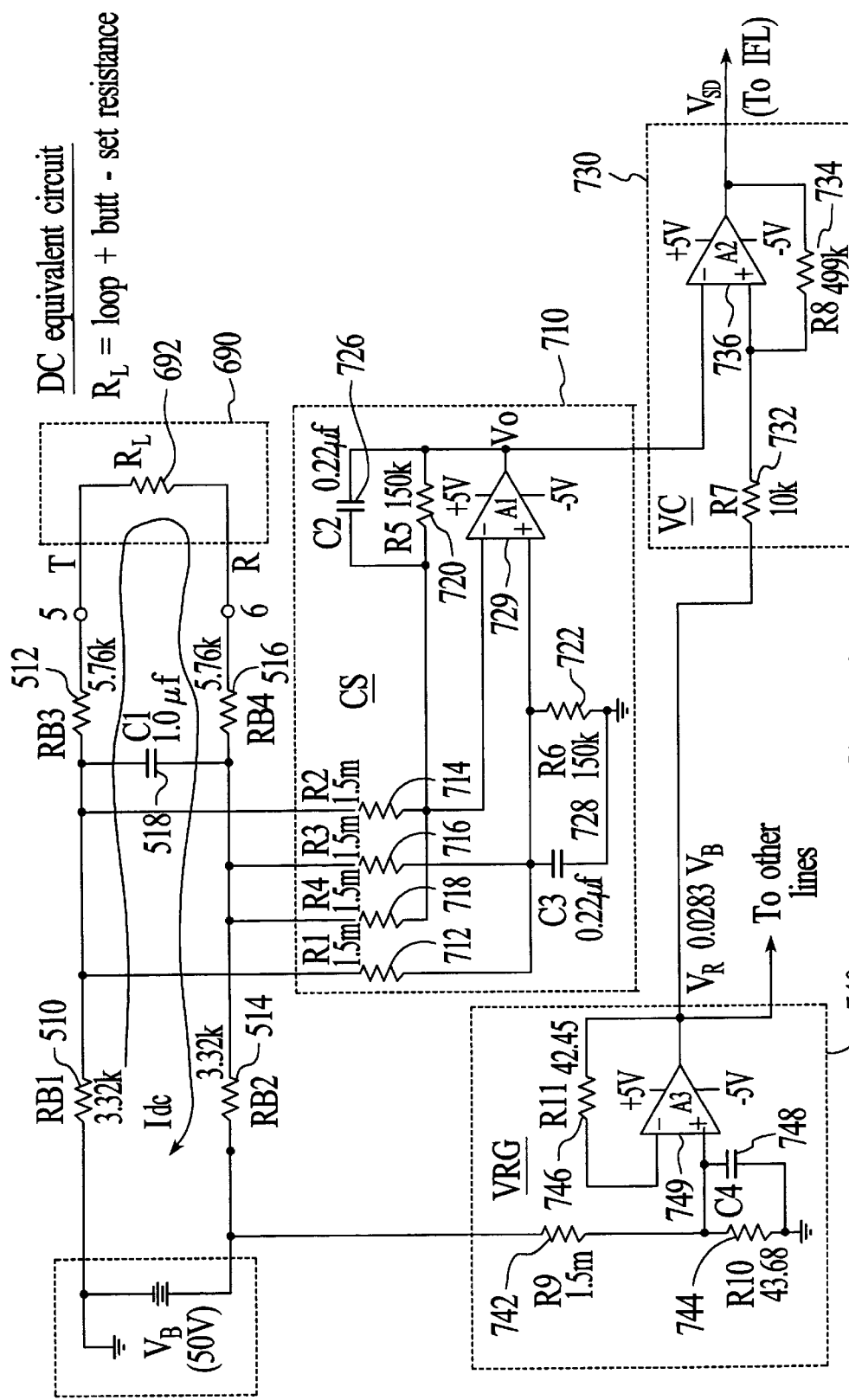
FIG. 7B illustrates a detailed circuit diagram of the BILS in accordance with the second preferred embodiment of the present invention.

The BILS 400 of the present invention can be implemented in two preferred embodiments using a detector with voltage sensing or current sensing. FIGS. 6A–6B illustrate the first preferred embodiment and FIGS. 7A–7B illustrate the second preferred embodiment of the present invention.

FIG. 6A illustrates a BILS functional block diagram in accordance with the first preferred embodiment of the present invention. The first preferred embodiment of a BILS 400a includes circuitry for sensing voltage. As discussed above, the battery injection function consists of resistors $R_{b1}$ 510, $R_{b3}$ 512, $R_{b2}$ 514, and $R_{b4}$ 516, voltage $V_b$, and capacitor $C_1$ 518, where voltage $V_b$ is generally a shared resource per circuit board or per shelf/rack. The battery injection circuitry is similar for both embodiments, except that components values may be different (e.g., ohms). The values for resistors $R_{b1}$ 510 and $R_{b2}$ 514 are the same, and likewise the values for resistors $R_{b3}$ 512, and $R_{b4}$ 516.

The loop supervision function consists of the following functional blocks: voltage reference generator VRG 610; voltage sensor VS 620; voltage comparator VC 630; interface logic IF 640; relay K 410; and control processor CTRL 406. The voltage sensor VS 620 is used for detecting the voltage across the copper loop at points 3 and 4. The detected voltage at points 3 and 4 is a function of the resistors $R_{l1}$ 34, $R_{l2}$ 36, and $R_m$ 52 or $R_t$ 56, depending on whether the butt set 10 is set in monitor or talk mode. The voltage reference generator VRG 610 derives a reference voltage $V_r$ from the battery voltage $V_b$. The reference voltage value $V_r$ is selected to provide an off-hook indicator when talk mode is selected in the butt set 10 via resistor $R_t$ 56. Alternatively, when monitor mode is selected in the butt set 10, the output voltage $V_o$ of the voltage sensor 620 will not trigger an off-hook condition through the resistor $R_m$ 52.

The voltage comparator VC 630 compares the output voltage $V_o$ from the voltage sensor 620 with the reference voltage $V_r$ from the voltage reference generator VRG 610. If output voltage $V_o$ is greater than reference voltage $V_r$, a loop status signal (i.e., logical signal) $V_{sd}$ representing an off-hook condition is outputted from the voltage comparator VC 630 to the control processor CTRL 406 via the interface logic IFL 640 for processing. The control processor CTRL 406 reads this information and then provides the appropriate control data through the interface logic IFL 640 to the relay K 410.

It should be pointed out that the voltage sensor VS 620 is designed to respond only to transverse signals. For longitudinal signals, the output voltage $V_o$ of the voltage sensor VS 620 is approximately zero because the voltages at points 3 and 4 are nominally the same value.

FIG. 6B illustrates a detailed circuit diagram of the BILS in accordance with the first preferred embodiment of the present invention. Reference will be made concurrently to FIGS. 6A and 6B for a more complete understanding of the first preferred embodiment of the present invention. FIG. 6B illustrates a more detailed circuit diagram of the BILS 400a, while representing the circuitry of the outside plant as the equivalent circuit 690 having resistor $R_L$ 692 corresponding to the resistors on the copper loop and the butt set. DTU-C and DTU-R are not illustrated in this figure since they have no impact to this circuitry from the DC signal stand point.

The BILS 400a circuitry consists of resistors $R_{b1}$ 510, $R_{b3}$ 512, $R_{b2}$ 514, $R_{b4}$ 516, voltage $V_b$, and capacitor $C_1$ 518. As previously above, $V_b$ (i.e., 50V) is generally a shared resource per circuit board or shelf/rack for maximizing cost advantages. The values for the resistors in FIG. 6B are chosen to optimize performance for power dissipation, power surge and lightning protection, circuit operation, and impedance loading impact on the DSL copper loop. The value of the capacitor $C_1$ 518 is chosen to optimize response time for loop supervision, mitigating interference conditions on the DSL copper loop, and suppression of transients.

Functionally, the voltage reference generator VRG 610 includes an amplifier A3 619, resistors $R_8$ 612, $R_9$ 614, $R_{10}$ 616, and capacitor C, 618. When a reference voltage $V_r$ is generated from the voltage reference generator VRG 610, it is inputted into the voltage comparator VC 630. The circuitry of the voltage reference generator VRG 610 in FIG. 6B is on a per board basis and is shared by multiple copper loops on the same board.

Functionally, the voltage sensor VS 620 is represented by an amplifier A1 629, and resistors $R_1$ 622, $R_2$ 624, $R_3$ 626, $R_4$ 628. The output voltage $V_o$ generated by the voltage sensor VS 620 is also inputted into the voltage comparator VC 630, which includes an amplifier $A_2$ 639, resistors $R_5$ 632, $R_6$ 634, $R_7$ 634, and capacitor $C_2$ 638. The voltage comparator VC 630 then outputs a loop status signal $V_{sd}$ representing an on-hook or off-hook loop condition to the control processor CTRL 406 via the interface logic IFL 640 (see FIG. 6A). Essentially, the voltage comparator VC 630 compares the output voltage $V_o$ with the reference voltage $V_r$, and when the output voltage $V_o$ is greater than the reference voltage $V_r$, and an off-hook indicator signal is represented by the loop status signal $V_{sd}$.

FIG. 7A illustrates a BILS functional block diagram in accordance with the second preferred embodiment of the present invention. The second preferred embodiment of the BILS 400b includes circuitry for sensing current. The functional block diagram of the second preferred embodiment is similar to the functional block diagram of the first preferred embodiment except that the voltage sensor VS 620 is replaced by a current sensor CS 710.

The current sensor CS 710 includes amplifiers A1 712, A2 714, and summing point S1 716. Amplifiers A1 712, A2 714 are used to sense the voltages across resistors $R_{b1}$ 510, $R_{b2}$ 514, respectively. These voltages are directly proportional to the current $I_{dc}$ that flows through the resistors $R_{b1}$ 510, $R_{b2}$ 514. Resistors $R_{b1}$ 510, $R_{b2}$ 514 are chosen to have the same value, and amplifiers A1 712, A2 714 are chosen to have the same characteristics, and hence the output voltages of amplifiers A1 712, A2 714 will have the same values and polarity. Summing point S1 716 sums the outputs of amplifiers A1 712, A2 714 to produce an output voltage $V_o$. The output voltage $V_o$ is inputted into the voltage comparator VC 730 for comparing with a reference voltage $V_r$ from the voltage reference generator 740. If output voltage $V_o$ is greater than the reference voltage $V_r$, an active off-hook signal corresponding to the loop status signal $V_{sd}$ is generated by the voltage comparator VC 730. The loop status signal $V_{sd}$ is then sent to the control processor CRTL 406 via an interface logic IFL 640 for further processing. It should also be noted that the current sensor CS 710 is designed to respond only to transverse signals. Accordingly, for longitudinal signals, the voltage drops across resistors $R_{b1}$ 510, $R_{b2}$ 514 are nominally of the same magnitude but of different polarities. Therefore, when the voltage from the amplifiers A1 112, A2 714 are summed up by the summing point S1 716, the resulting output voltage $V_o$ is essentially zero.

FIG. 7B illustrates a detailed circuit diagram of the BILS in accordance with the second preferred embodiment of the present invention. Again, reference will be made concurrently to FIGS. 7A and 7B for a more complete understanding of the second preferred embodiment of the present invention. FIG. 7B illustrates a more detailed circuit diagram of the BILS 400b, while representing the circuitry of the outside plant as the equivalent circuit 690 having resistor $R_L$ 692 corresponding to the resistors on the copper loop and the butt set. Again, DTU-C and DTU-R are not illustrated in this figure since they have no impact to this circuitry from the DC signal stand point.

The battery injection circuitry is the same as the circuitry in FIG. 6B, except that the values of some of the resistors have been modified for optimal circuit performance.

Functionally, the voltage reference generator VRG 740 includes an amplifier $A_3$ 749, resistors $R_9$ 742, $R_{10}$ 744, $R_{11}$ 746, and capacitor $C_4$ 748. A reference voltage $V_r$, which voltage is shared by all loops on the same circuit board, from the voltage reference generator VRG 740 is inputted into a voltage comparator VC 730. The current sensor CS 710 includes amplifier $A_1$ 729, resistors $R_1$ 712, $R_2$ 714, $R_3$ 716, $R_4$ 718, $R_5$ 720, $R_6$ 722 and capacitors $C_2$ 726, $C_3$ 728. The current sensor CS 710 outputs an output voltage $V_o$ to the voltage comparator VC 730.

Functionally, the voltage comparator VC 730 consists of amplifier $A_2$ 736, and resistors $R_7$ 732, $R_8$ 734. The voltage comparator VC 730 outputs a loop status signal $V_{sd}$ representing an on-hook or off-hook loop condition to the control processor CTRL 406 via an interface logic IFL 640 (see FIG. 7A). In essence, the voltage comparator VC 730 compares the output voltage $V_o$ with the reference voltage $V_r$, and when the output voltage $V_o$ is greater than the reference voltage $V_r$, an off hook indicator signal is represented by the loop status signal $V_{sd}$.

In other embodiments, other components can be substituted for the specific components described herein so long as these components perform essentially identical functions as described herein.

In the previous descriptions, numerous specific details are set forth, such as specific functions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

We claim:

1. A method of generating an audible tone in a digital subscriber loop (DSL) environment, the DSL environment including a first DSL termination unit, a second DSL termination unit coupled to the first DSL termination unit through a copper loop, and a testing instrument coupled to the copper loop in between the first and second DSL termination units, the method comprising:

coupling a cross connect unit in between the first DSL termination unit and the second DSL termination unit, the cross connect unit comprising a resource card and a battery injection and loop supervision (BILS) unit; and generating a direct current path to the testing instrument using the resource card and/or the BILS unit, thereby generating the audible tone.

2. A method according to claim 1 further comprising using a voltage source in the resource card to generate the audible tone.

3. A method according to claim 1, wherein the resource card includes a control processor and a service circuit.

4. A method according to claim 3 further comprising the step of coupling the control processor and the service circuit to a plurality of copper loops via a control bus and a test bus, respectively.

5. A method according to claim 1 further comprising:
generating the direct current path using a voltage source in the BILS unit;
monitoring the copper loop using a detector from the BILS unit; and
comparing an output voltage from the detector to a reference voltage using a voltage comparator from the BILS unit.

6. A method according to claim 5, wherein the detector includes a voltage sensor for detecting voltages at two or more points on the copper loop.

7. A method according to claim 6, wherein the detector includes a current sensor for detecting currents at two or more points on the copper loop.

8. A cross connect unit for generating an audible tone in a digital subscriber loop (DSL) environment, the DSL environment including a first DSL termination unit, a second DSL termination unit coupled to the first DSL termination unit through a copper loop, and a testing instrument coupled to the cooper loop in between the first and second DSL termination units, the cross connect unit comprising:
a resource card coupled to the cooper loop;
a battery injection and loop supervision (BILS) unit coupled to the resource card and the copper loop; and
means for generating a direct current path to the testing instrument using the resource card and/or the BILS unit, thereby generating the audible tone to the testing instrument.

9. A cross connect unit according to claim 8, wherein the resource card includes a control processor and a service circuit.

10. A cross connect unit according to claim 9, wherein the control processor and the service circuit can be coupled to a plurality of copper loops via a control bus and a test bus, respectively.

11. A cross connect unit according to claim 8, wherein the BILS unit includes:
a voltage source for generating the direct current path;
a plurality of resistors coupled to the voltage source;
a capacitor coupled to the plurality of resistors;
a detector for monitoring the copper loop; and
a voltage comparator for comparing an output voltage from the detector and a reference voltage.

12. A cross connect unit according to claim 11, wherein the detector includes a voltage sensor for detecting voltages at two or more points on the copper loop.

13. A cross connect unit according to claim 11, wherein the detector includes a current sensor for detecting currents at two or more points on the copper loop.

14. A cross connect unit according to claim 8, wherein the audible tone is generated using a signal source in the resource card, wherein the signal source comprises one of a voltage source and a current source.

15. A cross connect unit according to claim 8, wherein the resource card includes a control processor and a service circuit.

16. A cross connect unit according to claim 15, wherein the control processor and the service circuit can be coupled to a plurality of copper loops via a control bus and a test bus, respectively.

* * * * *